United States Patent
Okumura

(10) Patent No.: US 9,451,118 B2
(45) Date of Patent: Sep. 20, 2016

(54) IMAGE PROCESSING APPARATUS

(71) Applicant: KYOCERA Document Solutions Inc.

(72) Inventor: Ryuichi Okumura, Osaka (JP)

(73) Assignee: Kyocera Document Solutions Inc.

(*) Notice: Subject to any disclaimer, the term of this patent is extended or adjusted under 35 U.S.C. 154(b) by 0 days.

(21) Appl. No.: 14/938,793

(22) Filed: Nov. 11, 2015

(65) Prior Publication Data

US 2016/0150118 A1    May 26, 2016

(30) Foreign Application Priority Data

Nov. 21, 2014 (JP) ................. 2014-236936

(51) Int. Cl.
*H04N 1/207* (2006.01)
*H04N 1/21* (2006.01)
*G06K 9/00* (2006.01)

(52) U.S. Cl.
CPC .......... *H04N 1/207* (2013.01); *G06K 9/00456* (2013.01); *H04N 1/2104* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 5,901,274 | A | * | 5/1999 | Oh | H04N 1/393 358/1.2 |
| 5,969,829 | A | * | 10/1999 | Matsuda | H04N 1/1013 355/25 |
| 6,219,463 | B1 | * | 4/2001 | Hyodo | G06K 7/10722 358/486 |
| 6,603,864 | B1 | * | 8/2003 | Matsunoshita | G06T 1/0028 382/100 |
| 7,720,290 | B2 | * | 5/2010 | Shimura | H04N 1/00838 358/1.2 |
| 2003/0113015 | A1 | * | 6/2003 | Tanaka | G06K 9/00973 382/176 |
| 2007/0002398 | A1 | * | 1/2007 | Ohama | H04N 1/1017 358/474 |
| 2007/0291327 | A1 | * | 12/2007 | Saito | G03G 15/235 358/496 |
| 2008/0144131 | A1 | * | 6/2008 | Jung | G06K 9/2063 358/474 |
| 2010/0172590 | A1 | * | 7/2010 | Foehr | H04N 1/00326 382/217 |
| 2012/0189202 | A1 | * | 7/2012 | Kan | G06F 17/241 382/176 |

FOREIGN PATENT DOCUMENTS

JP    2006-093949    4/2006

* cited by examiner

*Primary Examiner* — Ming Hon

(57) ABSTRACT

For calculating a zooming ratio for a scanned image of an original document that includes a handwritten object, in each of the primary and the secondary scanning direction, the zooming ratio calculating unit generates projection images of black objects in an original image of the original document and the scanned image, identifies the smallest and largest pixel positions in the projection image of the original image, identifies the corresponding smallest and largest pixel positions in the projection image of the scanned image, and calculates the zooming ratio on the basis of a two distances between the smallest and the largest pixel positions of the original image and the scanned image. After zooming the scanned image by the zooming ratio, an image of the handwritten object is extracted on the basis of the zoomed scanned image and the original image.

6 Claims, 5 Drawing Sheets

IMAGE PROCESSING APPARATUS

CROSS-REFERENCE TO RELATED APPLICATIONS

This application relates to and claims priority rights from Japanese Patent Application No. 2014-236936, filed on Nov. 21, 2014, the entire disclosures of which are hereby incorporated by reference herein.

BACKGROUND

1. Field of the Present Disclosure

The present disclosure relates to an image processing apparatus.

2. Description of the Related Art

In a case of scanning an image of a document obtained by writing a handwritten object (a character, a figure or the like) in an original document as a printed matter, an image processing method scans both images of the original document and the document in which the handwritten object has been written and obtains an image of the handwritten object on the basis of a difference between the both images.

However, in the aforementioned method, another copy of the original document as a paper medium must be kept apart from the original document on which the handwritten object has been written.

Further, although it can be considered to store image data used for printing the original document in a printing device, and obtain an image of the handwritten object on the basis of a difference between an image of the original document based on the image data and a scanned image obtained from the original document onto which the handwritten object has been written using an image scanning device, in such a case, it is difficult to exactly extract the handwritten object from the scanned image because the image of the original document is not identical to the other part than the handwritten object in the scanned image due to a characteristic (resolution or the like) of the printing device and a characteristic (image distortion in an optical system, color shift, resolution or the like) of the image scanning device.

SUMMARY

An image processing apparatus according to an aspect of the present disclosure includes a scanned image obtaining unit, an original image obtaining unit, a zooming ratio calculating unit, a zoom processing unit, and a handwritten image extracting unit. The scanned image obtaining unit is configured to use an image scanning device and thereby obtain a scanned image of an original document in which a handwritten object has been written. The original image obtaining unit is configured to obtain original image printing data that was used for printing the original document. The zooming ratio calculating unit is configured to calculate a zooming ratio for the scanned image on the basis of the scanned image and an original image obtained from the original image printing data. The zoom processing unit is configured to perform zooming of the scanned image by the zooming ratio calculated by the zooming ratio calculating unit. The handwritten image extracting unit is configured to extract an image of the handwritten object from the scanned image zoomed by the zoom processing unit on the basis of the scanned image zoomed by the zoom processing unit and the original image. Further, the zooming ratio calculating unit (a) generates projection images of a black object in the original image in a primary scanning direction and a secondary scanning direction, (b) generates projection images of a black object in the scanned image in the primary scanning direction and the secondary scanning direction, (c) in the primary scanning direction, identifies a smallest value and a largest value of pixel positions in the projection image of the original image, identifies a smallest value and a largest value of pixel positions in the projection image of the scanned image corresponding to the smallest value and the largest value of the original image, and calculates a zooming ratio in the primary scanning direction on the basis of a distance between the smallest value and the largest value of the original image and a distance between the smallest value and the largest value of the scanned image, and (d) in the secondary scanning direction, identifies a smallest value and a largest value of pixel positions in the projection image of the original image, identifies a smallest value and a largest value of pixel positions in the projection image of the scanned image corresponding to the smallest value and the largest value of the original image, and calculates a zooming ratio in the secondary scanning direction on the basis of a distance between the smallest value and the largest value of the original image and a distance between the smallest value and the largest value of the scanned image.

These and other objects, features and advantages of the present disclosure will become more apparent upon reading of the following detailed description along with the accompanied drawings.

DETAILED DESCRIPTION

Hereinafter, embodiments according to aspects of the present disclose will be explained with reference to drawings.

Embodiment 1

Figure 1:
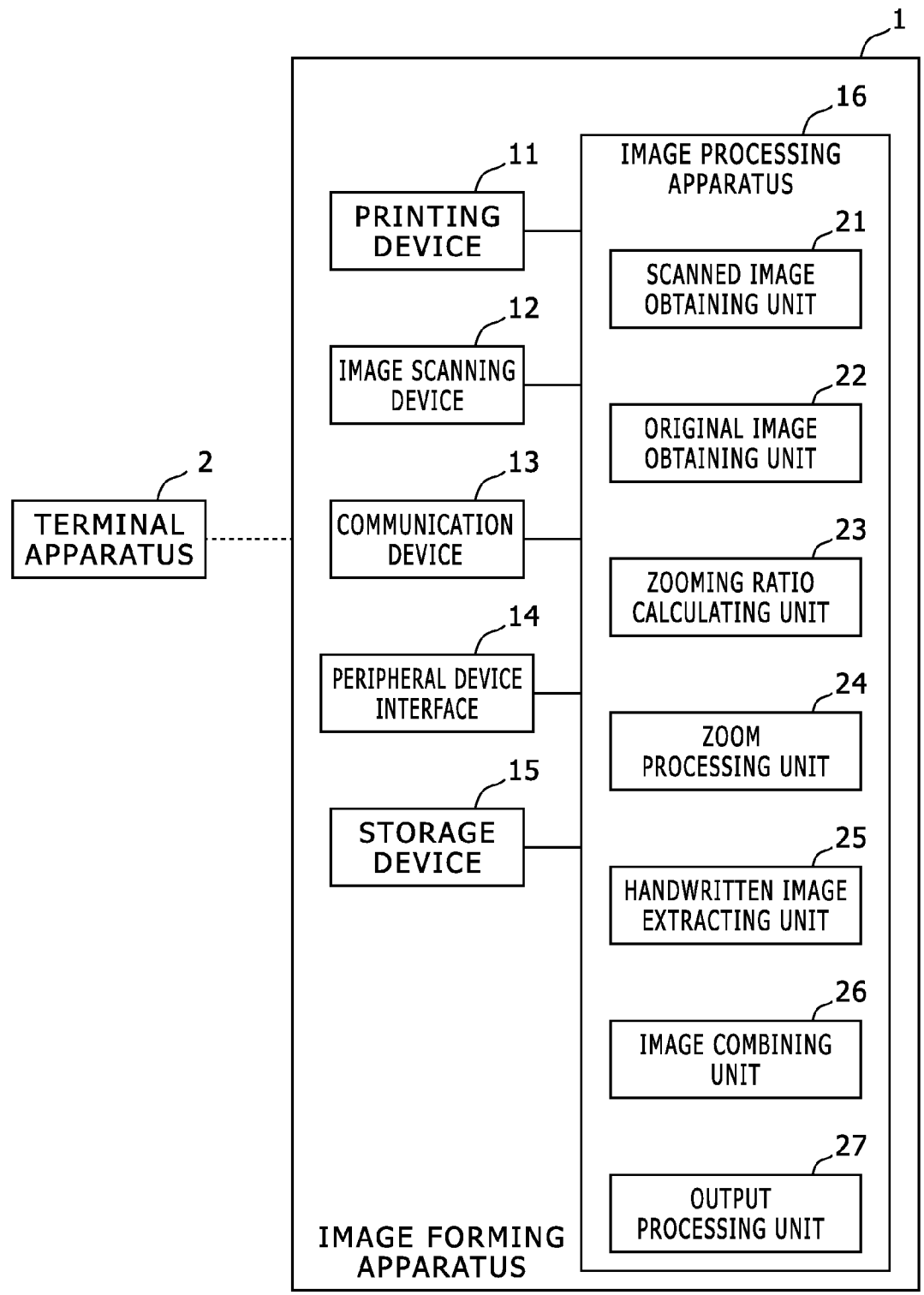
FIG. 1 shows a block diagram that indicates a configuration of an image forming apparatus that includes an image processing apparatus according to Embodiment 1 of the present disclosure.

FIG. 1 shows a block diagram that indicates a configuration of an image forming apparatus that includes an image processing apparatus according to Embodiment 1 of the present disclosure. The image forming apparatus 1 is a multi function peripheral, but may be a scanner, a copier or the like.

This image forming apparatus 1 includes a printing device 11, an image scanning device 12, a communication device 13, a peripheral device interface 14, a storage device 15 and an image processing apparatus 16.

The printing device 11 is an internal device as an example of an output device that prints a document image based on image data after sorts of image processing by the image processing apparatus 13 in an electrophotographic process using toner of CMYK (Cyan, Magenta, Yellow, and Black) colors.

Further, the image scanning device 12 is an internal device that optically scans a document image of a document and generates image data of the document image as RGB data.

Furthermore, the communication device 13 performs data communication with a terminal apparatus 2, an unshown cloud server or the like through a network. For example, a network interface or the like is used as the communication device 13.

Furthermore, the peripheral device interface 14 is an interface circuit enabled to connect a flash drive such as a USB (Universal Serial Bus) flash drive or a memory card. For example, a USB interface is used as the peripheral device interface 14.

Furthermore, the storage device 15 is a non volatile rewritable storage device such as a flash memory and stores sorts of data and programs.

The image processing apparatus 16 performs image processing for image data such as the image data generated by the image scanning device 12. The image processing apparatus 16 is embodied with an ASIC (Application Specific Integrated Circuit), a computer or the like, and acts as a scanned image obtaining unit 21, an original image obtaining unit 22, a zooming ratio calculating unit 23, a zoom processing unit 24, a handwritten image extracting unit 25, an image combining unit 26, and an output processing unit 27.

The scanned image obtaining unit 21 uses the image scanning device 12 and thereby obtains a scanned image of an original document in which a handwritten object has been written.

In Embodiment 1, the original document includes only a monochrome object (a character, a figure or the like) and no color objects (i.e. chromatic color objects). However, if the image scanning device 12 is a color scanner, the scanned image obtaining unit 21 obtains a scanned image expressed by color image data.

The original image obtaining unit 22 obtains original image printing data that was used for printing the original document.

For example, when printing the original document, the original image obtaining unit 22 stores printing data (i.e. PDL (Page Description Language) data, a PDF (Portable Document Format) file or the like) received from the terminal apparatus 2 as the original image printing data, into an unshown flash drive using the peripheral device interface 14 or into an unshown server using the communication device 13. Afterward, for extraction of a handwritten object, the original image obtaining unit 22 reads the original image printing data stored in the flash drive or the server using the peripheral device interface 14 or the communication device 13.

It should be noted that if the printing data is PDL data, then the original image obtaining unit 22 performs a rasterizing process and thereby generates an original image with a resolution as same as a resolution of the scanned image (i.e. raster image data of the original image).

The zooming ratio calculating unit 23 calculates a zooming ratio for the scanned image on the basis of the aforementioned scanned image and the aforementioned original image obtained from the original image printing data.

Figure 2:
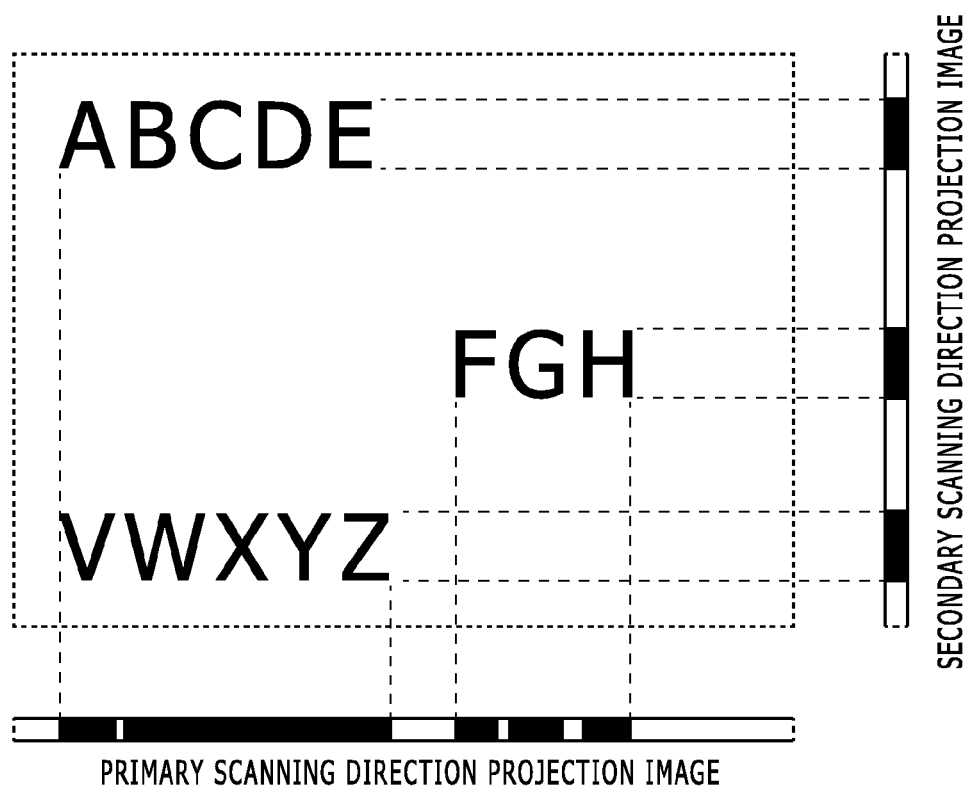
FIG. 2 shows a diagram that explains a projection image generated by the zooming ratio calculating unit 23 in FIG. 1.
Figure 3:
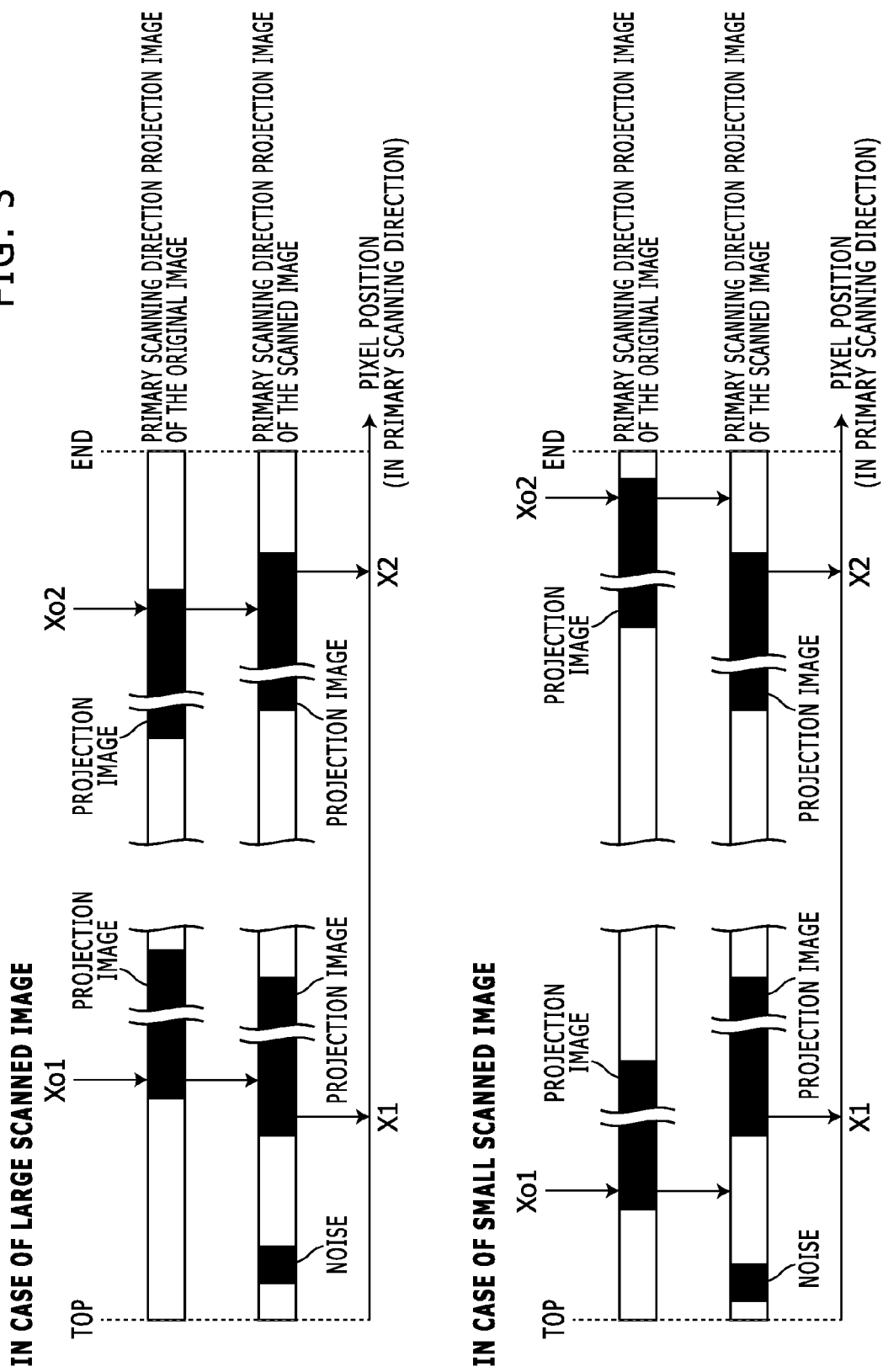
FIG. 3 shows a diagram that explains a smallest value and a largest value of pixel positions in a projection image generated by the zooming ratio calculating unit 23 in FIG. 1.

FIG. 2 shows a diagram that explains a projection image generated by the zooming ratio calculating unit 23 in FIG. 1. FIG. 3 shows a diagram that explains a smallest value and a largest value of pixel positions in a projection image generated by the zooming ratio calculating unit 23 in FIG. 1.

Specifically, as shown in FIG. 2, the zooming ratio calculating unit 23 firstly (a) generates projection images (i.e. one dimensional images) of each black object in the original image in a primary scanning direction and a secondary scanning direction, and (b) generates projection images (i.e. one dimensional images) of a black object in the scanned image in the primary scanning direction and the secondary scanning direction.

If the original image and the scanned image are expressed as color image data, then for all colors of CMY (or RGB), the zooming ratio calculating unit 23 detects a pixel position of a pixel having 100 percent density (a pixel having the value of 255 in case of 8-bit CMY data or a pixel having the value of zero in case of RGB data), and sets a pixel value at the determined pixel position as 1 in the projection image of the primary scanning direction. Therefore, a pixel value of the projection image is set as zero at a pixel position where no pixels of the original image or the scanned image have 100 percent density in the primary scanning direction, and a pixel value of the projection image is set as 1 at a pixel position where at least one pixel of the original image or the scanned image has 100 percent density in the primary scanning direction (i.e. black pixels in FIG. 2). The projection image of the secondary scanning direction is also generated in the same manner.

Subsequently, as shown in FIG. 3, the zooming ratio calculating unit 23 (c1) in the primary scanning direction, identifies a smallest value Xo1 and a largest value Xo2 of pixel positions in the projection image of the original image, identifies pixels (pixels at X1 and X2) at pixel positions in the projection image of the scanned image corresponding to the smallest value Xo1 and the largest value Xo2 of the original image, and (c2) calculates a zooming ratio in the primary scanning direction on the basis of a distance (i.e. Xo2−Xo1) between the smallest value Xo1 and the largest value Xo2 of the original image and a distance (i.e. X2−X1) between the identified pixels in the projection image of the scanned image, in accordance with the following formula.

$$\text{Zooming ratio} = (X2 - X1)/(Xo2 - Xo1)$$

More specifically, as shown in FIG. 3, (e1) if the projection image of the scanned image exists at a pixel position having the smallest value Xo1 of the original image, the zooming ratio calculating unit 23 identifies a pixel at the pixel position of the smallest value X1 in the existing projection image of the scanned image as a pixel corresponding to a pixel at the pixel position of the smallest value Xo1 of the original image, and (e2) if the projection image of the scanned image exists at a pixel position having the largest value Xo2 of the original image, the zooming ratio calculating unit 23 identifies a pixel at the pixel position of the largest value X2 in the existing projection image of the scanned image as a pixel corresponding to a pixel at the pixel position of the largest value Xo2 of the original image.

In this case, the corresponding object in the scanned image gets larger than the object in the original image and consequently the zooming ratio is more than 1.

On the other hand, as shown in FIG. 3, (f1) if the projection image of the scanned image does not exist at a pixel position having the smallest value Xo1 of the original image, the zooming ratio calculating unit 23 identifies a pixel of the projection image in the scanned image as a pixel having the smallest value of the scanned image corresponding to the smallest value Xo1 of the original image, the pixel of the projection image in the scanned image being nearest to and larger than a pixel position having the smallest value Xo1 of the original image, and (f2) if the projection image of the scanned image does not exist at a pixel position having the largest value Xo2 of the original image, the zooming ratio calculating unit 23 identifies a pixel of the projection image in the scanned image as a pixel having the largest value Xo2 of the scanned image corresponding to the largest value of the original image, the pixel of the projection image in the scanned image being nearest to and smaller than a pixel position having the largest value Xo2 of the original image.

In this case, the corresponding object in the scanned image gets smaller than the object in the original image and consequently the zooming ratio is less than 1.

Further, in the secondary scanning direction, the zooming ratio calculating unit 23 (d1) identifies a smallest value and a largest value of pixel positions in the projection image of the original image, identifies a smallest value and a largest value of pixel positions in the projection image of the scanned image corresponding to the smallest value and the largest value of the original image, and (d2) calculates a zooming ratio in the secondary scanning direction on the basis of a distance between the smallest value and the largest value of the original image and a distance between the smallest value and the largest value of the scanned image.

In this process, the zooming ratio is calculated in consideration of only black pixels, and therefore, a handwritten object having a chromatic color is excluded in the calculation of the zooming ratio.

Furthermore, the zoom processing unit 24 performs zooming of the scanned image by the zooming ratio calculated by the zooming ratio calculating unit 23.

The handwritten image extracting unit 25 extracts an image of the handwritten image from the scanned image zoomed by the zoom processing unit 24 on the basis of (a) the scanned image zoomed by the zoom processing unit 24 and (b) the original image.

In Embodiment 1, the handwritten image extracting unit 25 extracts an image of the handwritten object from the scanned image zoomed by the zoom processing unit 24 on the basis of a difference between the scanned image zoomed by the zoom processing unit 24 and the original image.

The image combining unit 26 combines the scanned image extracted by the handwritten image extracting unit 25 with the original image. For example, the image combining unit 26 arranges the image of the handwritten object extracted by the handwritten image extracting unit 25 on the original image and thereby generates one raster image.

However, if a PDF file of the combined image is generated, then for example, the image combining unit 26 assigns a plain to the image of the handwritten object extracted by the handwritten image extracting unit 25 and arranges this plane on the original image and thereby generates the PDF file.

The output processing unit 27 performs printing the image obtained by the image combining unit 26 using the printing device 11 or outputting a PDF file obtained by the image combining unit 26 using the peripheral device interface 14 or the like.

Figure 4:
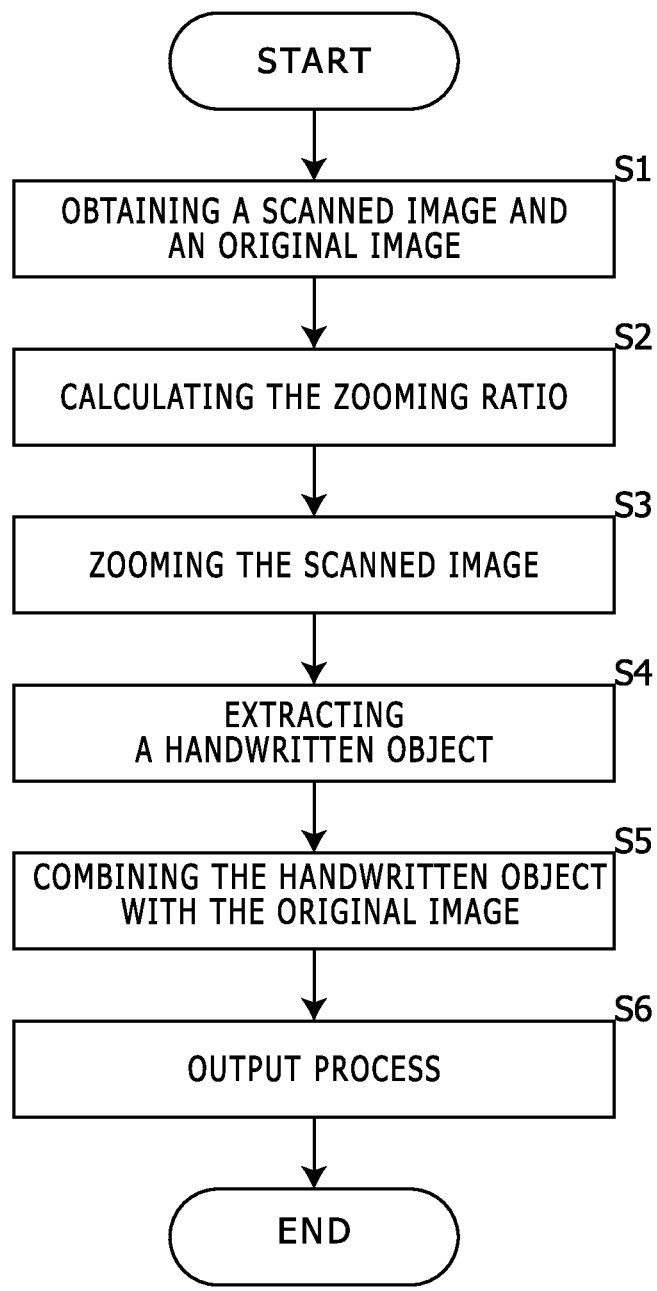
FIG. 4 shows a flowchart that explains a behavior of the image processing apparatus 16 shown in FIG. 1.

The following part explains a behavior of the image processing apparatus 16 in Embodiment 1. FIG. 4 shows a flowchart that explains a behavior of the image processing apparatus 16 shown in FIG. 1.

Firstly the scanned image obtaining unit 21 obtains a scanned image and the original image obtaining unit 22 obtains original image printing data (in Step S1).

Subsequently, the zooming ratio calculating unit 23 calculates zooming ratios in a primary scanning direction and a secondary scanning direction in the aforementioned manner (in Step S2). The zoom processing unit 24 zooms the scanned image by the calculated zooming ratios in the primary scanning direction and the secondary scanning direction, respectively (in Step S3).

Subsequently, the handwritten image extracting unit 25 calculates as an image of a handwritten object a difference between an original image obtained from the original image printing data and the zoomed scanned image (in Step S4).

The image combining unit 26 arranges the extracted image of the handwritten object on the original image and thereby generates an output image (in Step S5), and the output processing unit 27 performs printing the generated output image using the printing device 11 or transmitting an image data file of the generated output image using the peripheral device interface 14 or the like (in Step S6).

In the aforementioned Embodiment 1, in each of a primary scanning direction and in a second scanning direction independently, the zooming ratio calculating unit 23 (a) generates an projection image of a black object in an original image, (b) generates an projection image of a black object in a scanned image, (c) identifies a smallest value and a largest value of pixel positions in the projection image of the original image, identifies pixels in the projection image of the scanned image corresponding to the smallest value and the largest value of the original image, and (d) calculates a zooming ratio on the basis of a distance between the smallest value and the largest value of the original image and a distance between the identified pixels of the scanned image. Subsequently, a handwritten object is extracted on the basis of the scanned image zoomed by the zooming ratio obtained in this manner and the original image.

Consequently, since the size of the scanned image is matched to the size of the original image without consideration of a chromatic color object added after printing such as a handwritten object, an image of the handwritten object is properly extracted on the basis of: (a) an image of an original document based on image data used for printing of the original document in the printing device 11 and (b) a scanned image of the original document onto which the handwritten object has been written.

Embodiment 2

In Embodiment 2, the original document may include a color object.

Figure 5:
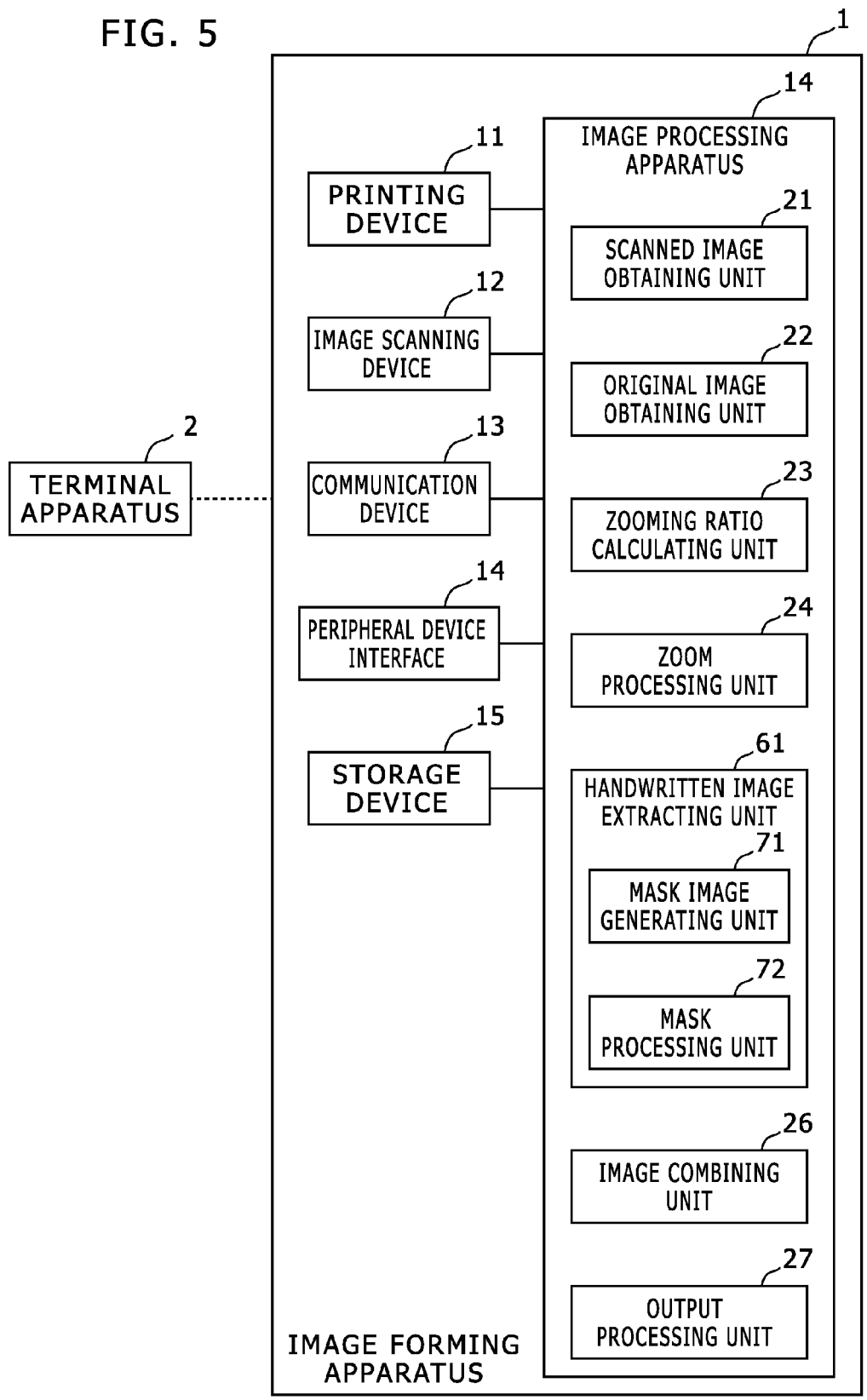
FIG. 5 shows a block diagram that indicates a configuration of an image forming apparatus that includes an image processing apparatus according to Embodiment 2 of the present disclosure.

FIG. 5 shows a block diagram that indicates a configuration of an image forming apparatus that includes an image processing apparatus according to Embodiment 2 of the present disclosure.

In Embodiment 2, in the scanned image zoomed by the zoom processing unit 24, a handwritten image extracting unit 61 masks a color that exists in the original image on the basis of color distribution of the original image obtained from original image printing data of an original document and thereby extracts an image of a handwritten object from the scanned image zoomed by the zoom processing unit 24.

The handwritten image extracting unit 61 includes a mask image generating unit 71 and a mask processing unit 72. The mask image generating unit 71 binarizes the original image and thereby generates a binary mask image. Specifically, the mask image generating unit 71 identifies a hue that exists in color distribution of the original image, sets a pixel value of a pixel having either the identified hue or an achromatic color as zero and sets a pixel value of another pixel as 1, and thereby generates the binary mask image. The mask processing unit 72 applies the mask image to the zoomed scanned image and thereby extracts the image of the handwritten object. Specifically, the mask processing unit 72 calculates a product of the mask image and the zoomed scanned image pixel by pixel and thereby extracts the image of the handwritten object in the zoomed scanned image.

The following part explains a behavior of the image processing apparatus 16 in Embodiment 2.

In Embodiment 2, after zooming the scanned image in the same manner of Embodiment 1, the handwritten image extracting unit 61 generates the mask image to mask a color that does not exist in the original image, and applies the mask image to the zoomed scanned image and thereby extracts the image of the handwritten object.

Other parts of the configuration and behaviors of the image forming apparatus 1 in Embodiment 2 are identical to those in Embodiment 1, and therefore, are not explained here.

Consequently, since the size of the scanned image is matched to the size of the original image without consideration of a chromatic color object (e.g. a handwritten object) other than a chromatic color object (e.g. a color graph, a color table or the like) that exists in the original image, even if the original document includes a color image, an image of the handwritten object is properly extracted on the basis of: (a) an image of an original document based on image data used for printing of the original document in the printing device 11 and (b) a scanned image of the original document onto which the handwritten object has been written.

The description has been presented for purposes of illustration and description, and is not intended to be exhaustive or limited.

For example, in Embodiment 2, it may be configured so that the handwritten image extracting unit 61 has a first operation mode and a second operation mode, selects the first operation mode or the second operation mode, and extracts the image of the handwritten object from the scanned image zoomed by the zoom processing unit 24 in the selected operation mode. Here the first operation mode is an operation mode that extracts the image of the handwritten object in the method explained in Embodiment 1, and the second operation mode is an operation mode that extracts the image of the handwritten object in the method explained in Embodiment 2. In such a case, the handwritten image extracting unit 61 may select the operation mode on the basis of setting data or may automatically select the operation mode on the basis of the original image. In such a case, for example, if the original image is a monochrome image (i.e. the original image includes no chromatic color objects), then the handwritten image extracting unit 61 select the first operation mode, and if the original image is a color image (i.e. the original image includes a chromatic color object), then the handwritten image extracting unit 61 select the second operation mode.

Further, in Embodiment 1 or 2, it may be configured to (a) generate a color histogram of the extracted image of the handwritten object, (b) converts each color that falls into each color range of the color histogram to a representative color of the color range and thereby reduce the number of colors in the extracted image of the handwritten object, and (c) combine the image of the handwritten object with the original image after the color reduction.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
a scanned image obtaining unit configured to use an image scanning device and thereby obtain a scanned image of an original document in which a handwritten object has been written;
an original image obtaining unit configured to obtain original image printing data that was used for printing the original document;
a zooming ratio calculating unit configured to calculate a zooming ratio for the scanned image on the basis of the scanned image and an original image obtained from the original image printing data;
a zoom processing unit configured to perform zooming of the scanned image by the zooming ratio calculated by the zooming ratio calculating unit; and
a handwritten image extracting unit configured to extract an image of the handwritten object from the scanned image zoomed by the zoom processing unit on the basis of the scanned image zoomed by the zoom processing unit and the original image;
wherein the zooming ratio calculating unit (a) generates projection images of a black object in the original image in a primary scanning direction and a secondary scanning direction, (b) generates projection images of a black object in the scanned image in the primary scanning direction and the secondary scanning direction, (c) in the primary scanning direction, identifies a smallest value and a largest value of pixel positions in the projection image of the original image, identifies a smallest value and a largest value of pixel positions in the projection image of the scanned image corresponding to the smallest value and the largest value of the original image, and calculates a zooming ratio in the primary scanning direction on the basis of a distance between the smallest value and the largest value of the original image and a distance between the smallest value and the largest value of the scanned image, and (d) in the secondary scanning direction, identifies a smallest value and a largest value of pixel positions in the projection image of the original image, identifies a smallest value and a largest value of pixel positions in the projection image of the scanned image corresponding to the smallest value and the largest value of the original image, and calculates a zooming ratio in the secondary scanning direction on the basis of a distance between the smallest value and the largest value of the original image and a distance between the smallest value and the largest value of the scanned image.

2. The image processing apparatus according to claim 1 wherein in order to identify the smallest value and the largest value of pixel positions in the projection image of the scanned image,
(e1) if the projection image of the scanned image exists at a pixel position having the smallest value of the original image, the zooming ratio calculating unit identifies a pixel position having the smallest value of the existing projection image of the scanned image as the smallest value of the scanned image corresponding to the smallest value of the original image, (e2) if the projection image of the scanned image exists at a pixel position having the largest value of the original image, the zooming ratio calculating unit identifies a pixel position having the largest value of the existing projection image of the scanned image as the largest value of the scanned image corresponding to the largest value of the original image, (f1) if the projection image of the scanned image does not exist at a pixel position having the smallest value of the original image, the zooming ratio calculating unit identifies a pixel of the projection image in the scanned image as a pixel having the smallest value of the scanned image corresponding to the smallest value of the original image, the pixel of the projection image in the scanned image being nearest to and larger than a pixel position having the smallest value of the original image, and (f2) if the projection image of the scanned image does not exist at a pixel position having the largest value of the original image, the zooming ratio calculating unit identifies a pixel of the projection image in the scanned image as a pixel having the largest value of the scanned image corresponding to the largest value of the original image, the pixel of the projection image in the scanned image being nearest to and smaller than a pixel position having the largest value of the original image.

3. The image processing apparatus according to claim 1 wherein the handwritten image extracting unit extracts the image of the handwritten object from the scanned image zoomed by the zoom processing unit on the basis of a difference between the scanned image zoomed by the zoom processing unit and the original image.

4. The image processing apparatus according to claim 1 wherein the handwritten image extracting unit masks in the scanned image zoomed by the zoom processing unit a color that exists in the original image on the basis of color distribution of the original image and thereby extracts the image of the handwritten object from the scanned image zoomed by the zoom processing unit.

5. The image processing apparatus according to claim 1 wherein the handwritten image extracting unit has a first operation mode and a second operation mode, selects the first operation mode or the second operation mode, and extracts the image of the handwritten object from the scanned image zoomed by the zoom processing unit in the selected operation mode; wherein the first operation mode extracts the image of the handwritten object from the scanned image zoomed by the zoom processing unit on the basis of a difference between the scanned image zoomed by the zoom processing unit and the original image; and the second operation mode masks in the scanned image zoomed by the zoom processing unit a color that exists in the original image on the basis of color distribution of the original image and thereby extracts the image of the handwritten object from the scanned image zoomed by the zoom processing unit.

6. The image processing apparatus according to claim 5 wherein the handwritten image extracting unit selects the first operation mode for the original image as a monochrome image and selects the second operation mode for the original image as a color image.

* * * * *